__United States Patent__ [19]

Sugiyama et al.

[11] 4,020,252

[45] Apr. 26, 1977

[54] VULCANIZATION ACCELERATOR SYSTEM FOR RUBBER COMPOSITIONS

[75] Inventors: Iwao Sugiyama; Teruhide Furuhama, both of Hiratsuka; Fumiaki Nagano, Chigasaki; Hiroshi Hirakawa, Isehara, all of Japan

[73] Assignee: The Yokohama Rubber Co., Ltd., Tokyo, Japan

[22] Filed: July 1, 1975

[21] Appl. No.: 592,173

[30] Foreign Application Priority Data

July 2, 1974 Japan .............................. 49-74986

[52] U.S. Cl. .................................. 526/30; 260/793
[51] Int. Cl.$^2$ ......................................... C08K 5/39
[58] Field of Search ...... 260/513.5, 94.7 S, 94.7 N, 260/85.1, 83.3, 794, 783, 784, 45.9 NC, 793; 526/30

[56] References Cited

UNITED STATES PATENTS

| | | | |
|---|---|---|---|
| 2,247,495 | 7/1941 | Harvey | 260/794 |
| 2,480,814 | 8/1949 | Punshon | 260/794 |
| 2,766,219 | 10/1956 | Beaver | 260/45.9 WC |
| 2,781,330 | 2/1957 | Downey | 260/45.9 WC |
| 3,725,363 | 4/1973 | Albert | 260/784 |
| 3,775,441 | 11/1973 | Baker | 260/85.1 |
| 3,799,954 | 3/1974 | Cain | 260/85.1 |
| 3,882,089 | 5/1975 | Baker | 260/83.3 |

OTHER PUBLICATIONS

"Materials & Compounding Ingredients for Rubber", 1968, Bill Pub., New York, p. 31, Chemical Abstracts, 1972, vol. 76, No. 142127q.

*Primary Examiner*—Paul R. Michl
*Attorney, Agent, or Firm*—Finnegan, Henderson, Farabow & Garrett

[57] ABSTRACT

Rubber compositions containing an alkylene-bisdithiocarbamate and an amine-isocyanate addition compound as a vulcanization accelerator having excellent scorching stability with rapid vulcanization at usual vulcanization temperatures.

4 Claims, 2 Drawing Figures

VULCANIZATION ACCELERATOR SYSTEM FOR RUBBER COMPOSITIONS

This invention relates to a vulcanization accelerator system and, more particularly, to a new and improved system in which vulcanization accelerators are produced chemically in the rubber composition.

There are many established techniques for adding vulcanization accelerators to rubber to shorten the vulcanization time, to lower the vulcanization temperature, to improve various characteristics of the vulcanized rubber articles and to improve the handling ability of the rubber during processing.

Vulcanization accelerators presently used in the industry, however, present many different problems. For example, dithiocarbamates or thiurams, so called "ultra-accelerators," rapidly accelerate vulcanization at conventional vulcanization temperatures, but they tend to create undesired scorching of the rubber during mixing or molding by their own activity.

Sulfenamides, so called "delayed action accelerators," on the other hand, are less scorchy, but they tend to retard the rate of vulcanization.

In other words, known accelerators generally have scorch characteristics directly proportional to their effect on the cure rate.

Accordingly, it has become important in the rubber industry to find novel accelerators or accelerator systems in which scorching is reduced or eliminated at the temperatures encountered during processing of the rubber while still achieving rapid vulcanization at conventional rubber vulcanization temperatures.

In this regard, there have been methods proposed in which the accelerators are prevented from being released below some limited temperature. In U.S. Pat. No. 1,511,984, for example, there is disclosed a method in which rubber is mixed with an accelerator having activated carbon adsorbed on the surface. Also, there is known a method in which rubber is mixed with barium trithiocarbonate which decomposes during heating to isolate carbon disulfide, and amines together with sulfur, zinc oxide and the like. Dithiocarbamic acid is then generated by the heat to carry out the vulcanization.

These accelerator systems, however, tend to release accelerator or some other active component even during the temperatures used during the processing of rubber, so little improvement in reducing scorching has been achieved.

More recently, a method has been proposed (Japanese P. Tokkai Sho 47-42850) in which polythiocarbonate, which releases carbon disulfide during heating, and amine or imine blocked with isocyanate, which releases amine or imine during heating, are mixed with rubber so as to generate dithiocarbamic acid at the vulcanization temperature. However, the polythiocarbonate used in this system has a decomposition temperature not very much higher than the temperature used during the processing step and since its thermalstability is, therefore, not very good, vulcanization gradually takes place even during the processing step.

It is an object of the present invention, therefore, to provide a vulcanization accelerator system in which scorching will not occur for a long time at the temperatures encountered during the processing of rubber but that permits vulcanization to take place rapidly once vulcanization temperatures are reached.

The vulcanization accelerator system of this invention is an "in situ" vulcanization system and essentially comprises two components. One of them is a compound that does not decompose for a long period of time at the processing temperature of rubber yet is rapidly decomposed at vulcanization temperatures to isolate carbon disulfide (hereinafter called "carbon disulfide source"), and the other is an amine or imine blocked with isocyanate (hereinafter called "amine source").

By adding them together with other components, such as sulfur and zinc oxide, into vulcanizable rubber, it was found that the scorching heretofore encountered did not take place for a long period of time during the processing step while vulcanization of the rubber at vulcanization temperatures took place rapidly and the further processing ability of the rubber was substantially improved.

In accordance with the present invention, the carbon disulfide source is an alkylene-bisdithiocarbamate, preferably having one of the following formulas:

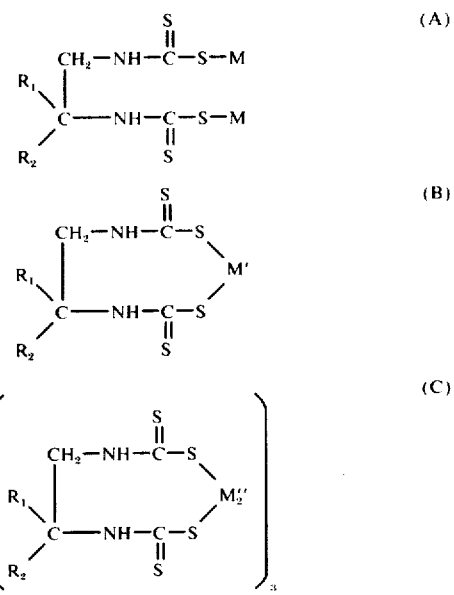

In each formula $R_1$ is selected from the group consisting of hydrogen, methyl or ethyl, and $R_2$ is selected from the group consisting of hydrogen, methyl, ethyl or propyl. M is selected from the group consisting of lithium, sodium or potassium, M' from the group consisting of calcium, manganese, cobalt, nickel, zinc, lead, antimony, bismuth, cadmium or copper, and M'' from the group consisting of iron, chromium or aluminum.

The other component of this invention, i.e., the amine source, is an amine or imine blocked with isocyanate or an addition compound of a secondary amine and isocyanate, preferably having the following formula:

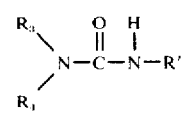

in which $R_3$ and $R_4$ are the same or different monovalent hydrocarbon radicals containing 1 to 8 carbon atoms; or constitute a divalent hydrocarbon radical containing 2 to 7 carbon atoms composed by bonding $R_3$ and $R_4$ to each other; or constitute a divalent non-acidic radical containing 2 to 8 carbon atoms and at least one heteroatom selected from the group consisting of oxygen, sulfur or nitrogen composed by bonding $R_3$ and $R_4$ to each other, and R' is an aromatic radical or an alkyl radical having from 4 to 18 carbon atoms; the aromatic or alkyl radical may contain an isocyanate radical or other substituent.

Of the drawings:

FIG. 1 shows vulcanization curves of the rubber compositions described in Examples 1 and 2 ; and FIG. 2 shows vulcanization curves of the rubber compositions described in Examples 3 and 4.

DETAILED DESCRIPTION

Figure 1:
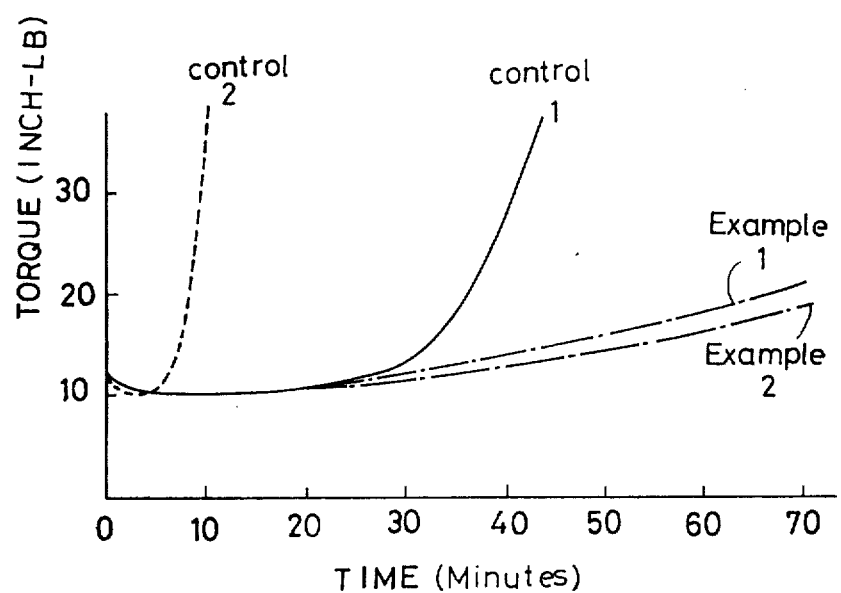

The carbon disulfide sources of this invention, alkylene-bisdithiocarbamates, are easily produced by known methods. For example, the compound in which $R_1$ and $R_2$ in the formula (A) are hydrogen is produced by reacting ethylenediamine and carbon disulfide with sodium hydroxide or potassium hydroxide.

The compounds of the general formula (B) or (C) are easily produced by reacting the compounds of the general formula (A) with chloride or sulfates of various metals.

Typical examples of suitable alkylene-bisdithiocarbamates are as follows: sodium ethylene-bisdithiocarbamate, potassium ethylene-bisdithiocarbamate, calcium ethylene-bisdithiocarbamate, manganese ethylene-bisdithiocarbamate, cobalt ethylene-bisdithiocarbamate, nickel ethylene-bisdithiocarbamate, zinc ethylene-bisdithiocarbamate, lead ethylene-bisdithiocarbamate, antimony ethylene-bisdithiocarbamate, cadmium ethylene-bisdithiocarbamate, cupric ethylene-bisdithiocarbamate, ferric ethylene-bisdithiocarbamate, chromium ethylene-bisdithiocarbamate, and aluminum ethylene-bisdithiocarbamate.

The amine sources of this invention, amine-isocyanate addition compounds, are easily produced by the following reaction:

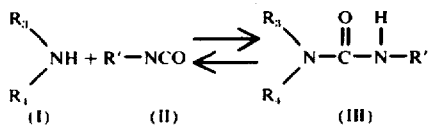

Amine (I) stabilized in form (III) is not concerned in the chemical reaction in the conventional processing step of rubber, yet at the vulcanization temperature, free amine is isolated to react with the carbon disulfide and produce a dithiocarbamate type accelerator in situ so that vulcanization can proceed rapidly.

Typical examples of amines in the above formula (I) are: dimethylamine, diethylamine, di-n-propylamine, di-isopropylamine, di-n-butylamine, di-sec-butylamine, di-tert-butylamine, di-2-ethyl-hexylamine, N-methyl-N-cyclohexylamine, dicyclohexylamine, diphenylamine, di-tolylamine, pyridone, piperidine, piperazine, pyrrole, pyrazole, imidazole, morphorine, pyrrolidine, etc.

Typical examples of isocyanates in the above formula (II) are: phenyl isocyanate, p-chlorophenyl isocyanate, hexamethylene di-isocyanate, octadecyl isocyanate, 2,4-and 2,6-toluene di-isocyanate, diphenylmethane-p, p'-di-isocyanate, p-phenylene di-isocyanate, dichlorodiphenylmethane di-isocyanate, naphthalene-1.5-di-isocyanate.

The above reaction to produce the addition compound is quite easily carried out. The isocyanate and amine are simply dissolved in suitable solvents and mixed to yield the product. The reaction is exothermic, so a reactor equipped with a cooler is preferably used.

In the production of the addition compound, the amine releasing temperature is widely changeable by the selection of the amine and the isocyanate to be used.

During mixing of the carbon disulfide source and the amine source into the rubber, zinc oxide, stearic acid, sulfur, fillers, other components usually used in the rubber composition can be simultaneously mixed in the usual manner.

The amounts of the carbon disulfide source and the amine source used can vary widely. Preferably, the carbon disulfide source as well as the amine source are both mixed in the range of from 0.1 to 10 parts by weight per 100 parts by weight of rubber.

The rubber used in the vulcanization system of this invention is rubber which is vulcanizable by a sulfur-accelerator system; in other words, a diene-type rubber containing an olefinically unsaturated group. For example, natural rubber, polyisoprene rubber, polybutadiene rubber, styrene-butadiene copolymer rubber, acrylonitrile-butadiene copolymer rubber, ethylene-propylene-diene terpolymer rubber, or mixtures thereof.

The invention will now be explained with reference to the following Examples but without intention to be limited thereby:

EXAMPLES 1 and 2

Rubber compositions are prepared by mixing in the usual manner the ingredients shown in Table 1. Control rubber samples (Controls 1 and 2) are also prepared for comparison with the rubber compositions containing the vulcanization accelerator systems of the present invention.

TABLE 1

| Ingredients | Example 1 | Example 2 | Control 1 | Control 2 |
|---|---|---|---|---|
| natural rubber | 100 | 100 | 100 | 100 |
| zinc oxide | 5 | 5 | 5 | 5 |
| stearic acid | 3 | 3 | 3 | 3 |
| HAF carbon black | 50 | 50 | 50 | 50 |
| Desolex No. 1 note 1) | 10 | 10 | 10 | 10 |
| sulfur | 2.3 | 2.3 | 2.3 | 2.3 |
| N-cyclohexyl-2-benzothiazole sulfenamide | | | 0.8 | |
| tetramethyl thiuram disulfide | | | | 0.4 |
| ferric ethylene-bisdithio- | | | | |

TABLE 1-continued

| Ingredients | Example 1 | Example 2 | Control 1 | Control 2 |
|---|---|---|---|---|
| carbamate | 1.0 | | | |
| zinc ethylene-bisdithio-carbamate | | 1.0 | | |
| pyrrolidine/diphenyl-methane-p,p'-di-isocyanate | 1.2 | 1.2 | | | note 1) aromatic type oil manufactured by Showa Oil Company Ltd.

Vulcanization of the rubber compositions was then carried out and the vulcanization characteristics of the rubber composition are measured by using an MPV type Rheometer manufactured by Monsanto Company. The results are shown in Table 2 below and also in FIG. 1.

In Table 2, Tc represents the optimum vulcanization time in minutes or time taken to reach 95% of maximum torque; Ts represents scorch time or time taken to reach torque of just 3-inch pounds higher than minimum torque.

TABLE 2

| Characteristic | | 125° C | Temperature 150° C | 160° C | 170° C |
|---|---|---|---|---|---|
| Example 1 | Tc | | 22.7' | 10.7' | 4.05' |
| | Ts | 34.0' | 3.9' | 1.7' | 0.6' |
| Example 2 | Tc | | 24.9' | 10.0' | 3.2' |
| | Ts | 41.0' | 4.9' | 1.9' | 0.7' |
| Control 1 | Tc | | 15.5' | 9.05' | 4.8' |
| | Ts | 30.5' | 4.3' | 2.5' | 1.08' |
| Control 2 | Tc | | 5.3' | 2.6' | |
| | Ts | 7.0' | 1.8' | 0.6' | |

Table 2 and FIG. 1 clearly show that rubber compositions using the carbon disulfide source of this invention have the following features in comparison with known rubber compositions using sulfenamide-type or thiuram-type accelerators:

1. excellent scorching resistance at usual processing temperatures (below 125° C); and
2. rapid vulcanization at usual vulcanization temperatures (above 160° C).

As is clear from the fact that the values of Tc are in reverse order between Examples 1 and 2 and Control 1 at a temperature of 170° C than at 160° C, it shows that the vulcanization accelerator systems of this invention have excellent characteristics, especially at high temperatures.

EXAMPLES 3 and 4

Rubber compositions are prepared as shown in Table 3, and experiments are conducted in the same manner as set forth in Examples 1 and 2. The testing results of the vulcanization characteristics of these compositions are shown in Table 4 and FIG. 2.

TABLE 3

| Ingredient | Example 3 | Example 4 | Control 3 | Control 4 |
|---|---|---|---|---|
| natural rubber | 100 | 100 | 100 | 100 |
| zinc oxide | 5 | 5 | 5 | 5 |
| stearic acid | 3 | 3 | 3 | 3 |
| HAF carbon black | 50 | 50 | 50 | 50 |
| Desolex No. 1 | 10 | 10 | 10 | 10 |
| sulfur | 1.0 | 1.0 | 2.3 | 1.0 |
| N-cyclohexyl-2-benzothiazole sulfenamide | | | 0.8 | |
| polythiocarbonate | | | | 1.0 |
| ferric ethylene-bisdithio-carbamate | 1.0 | | | |
| zinc ethylene-bisdithio-carbamate | | 1.0 | | |
| pyrrolidine/diphenyl-methane-p,p'-di-isocyanate | 1.2 | 1.2 | | 1.2 |

TABLE 4

| Characteristic | | 125° C | Temperature 150° C | 160° C |
|---|---|---|---|---|
| Example 3 | Tc | | 18.9' | 8.9' |
| | Ts | 39.0' | 4.5' | 1.8' |
| Example 4 | Tc | | 22.0' | 8.8' |
| | Ts | 47.5' | 5.5' | 2.4' |
| Control 3 | Tc | | 15.5' | 9.05' |
| | Ts | 30.5' | 4.3' | 2.5' |
| Control 4 | Tc | | 15.7' | 7.9' |
| | Ts | 36.0' | 2.8' | 1.9' |

Figure 2:
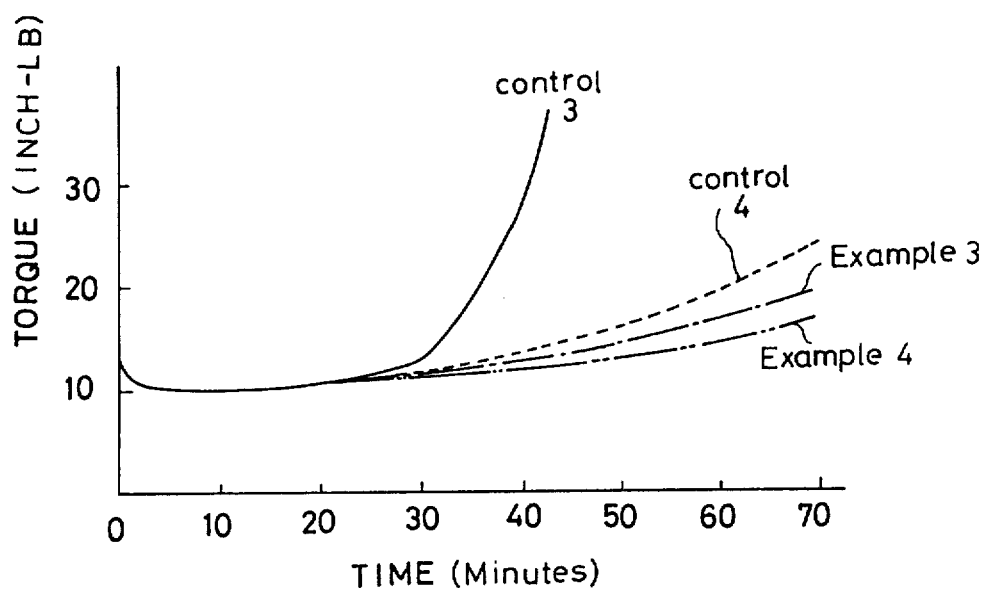

The advantages of this invention are even more clear from a comparison between Example 3 and Controls 3 and 4 in connection with the scorch time (Ts) at 125° C and optimum vulcanization time (Tc) at 160° C as shown in Table 4 and FIG. 2.

EXAMPLE 5

In connection with the rubber compositions of Examples 1 and 2 and Controls 1 and 2, as shown in Table 1, their Mooney characteristics were measured in accordance with JIS K-6300 and their vulcanizate properties were measured in accordance with JIS K-6301. Samples for testing vulcanizate properties were vulcanized at 149° C. The results are shown in Table 5 below.

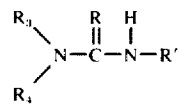

TABLE 5

| Mooney Characteristics | $T_5(ML_1)$<br>$T_{35}(ML_1)$<br>minimum(ML) | Example 1<br>17min. 42sec.<br>26min. 54sec.<br>38.5 | Example 2<br>19min. 37sec.<br>29min. 36sec.<br>33 | Control 1<br>19min. 54sec.<br>21min. 48sec.<br>33 | Control 2<br>8min. 00sec.<br>9min. 00sec.<br>34 | Control 4<br>23min. 00sec.<br>29min. 36sec.<br>35 |
|---|---|---|---|---|---|---|
| Vulcanizate Properties: | | | | | | |
| Tensile Strength | 10min.(kg/cm$^2$) | 227 | 181 | 273 | 216 | 226 |
| | 20 | 249 | 263 | 265 | 228 | 237 |
| | 30 | 221 | 235 | 243 | 225 | 225 |
| | 45 | 215 | 217 | 242 | 221 | 199 |
| Elongation | 10min. (%) | 625 | 605 | 565 | 445 | 635 |
| | 20 | 540 | 565 | 505 | 445 | 565 |
| | 30 | 465 | 495 | 475 | 445 | 545 |
| | 45 | 480 | 465 | 475 | 440 | 510 |
| 300% Modulus | 10min. (kg/cm$^2$) | 81 | 63 | 128 | 139 | 78 |
| | 20 | 122 | 124 | 146 | 143 | 103 |
| | 30 | 122 | 129 | 141 | 141 | 94 |
| | 40 | 118 | 126 | 138 | 136 | 98 |
| Hardness | 10min. (JIS A) | 55 | 53 | 61 | 63 | 53 |
| | 20 | 63 | 62 | 63 | 63 | 59 |
| | 30 | 64 | 65 | 63 | 63 | 59 |
| | 40 | 64 | 65 | 63 | 63 | 60 |
| Lupke Rebound Resilience (%) | | 48 | 47 | 48 | 48 | 45 |

As mentioned in the above detailed description, the vulcanization system of this invention consists essentially of a carbon disulfide source and an amine source that is chemically inert at usual processing temperature providing excellent scorching stability in comparison with known accelerator systems presently available.

Moreover, the vulcanization systems of this invention have a surprising effect on the rate of vulcanization and the time taken to reach optimum vulcanization from the start of the vulcanizing step which is clearly shorter in comparison with known sulfenamide type vulcanization accelerators.

What is claimed is:

1. A vulcanizable rubber composition comprising rubber containing an olefinically unsaturated group; ferric ethylene-bisdithiocarbamate; and an amine-isocyanate addition compound having the following formula:

in which $R_3$ and $R_4$ each represent a mono-valent hydrocarbon radical having from 1 to 8 carbon atoms; or together, a divalent hydrocarbon radical having from 2 to 7 carbon atoms; or together, a divalent non-acidic radical having from 2 to 8 carbon atoms and at least one atom selected from the group consisting of oxygen, sulfur and nitrogen; and R' represents an aromatic or alkyl radical having from 4 to 18 carbon atoms.

2. The rubber composition of claim 1, in which the rubber is selected from the group consisting of natural rubber, polyisoprene rubber, polybutadiene rubber, styrene-butadiene copolymer rubber, acrylonitrile-butadiene copolymer rubber, or ethylene-propylene-diene terpolymer rubber.

3. The rubber composition of claim 1, in which the amount of ferric ethylene-bisdithiocarbamate is 0.1 to 10 parts by weight per 100 parts by weight of rubber.

4. The rubber composition of claim 1, in which the amount of the amine-isocyanate addition compound is 0.1 to 10 parts by weight per 100 parts by weight of rubber.

* * * * *